INVENTORS
Stanley J. Gartner
LaRue V. Regelman
BY
Michael Hertz
ATTORNEY

March 6, 1962 S. J. GARTNER ETAL 3,023,880
CONVEYOR
Filed Oct. 10, 1960 5 Sheets-Sheet 3
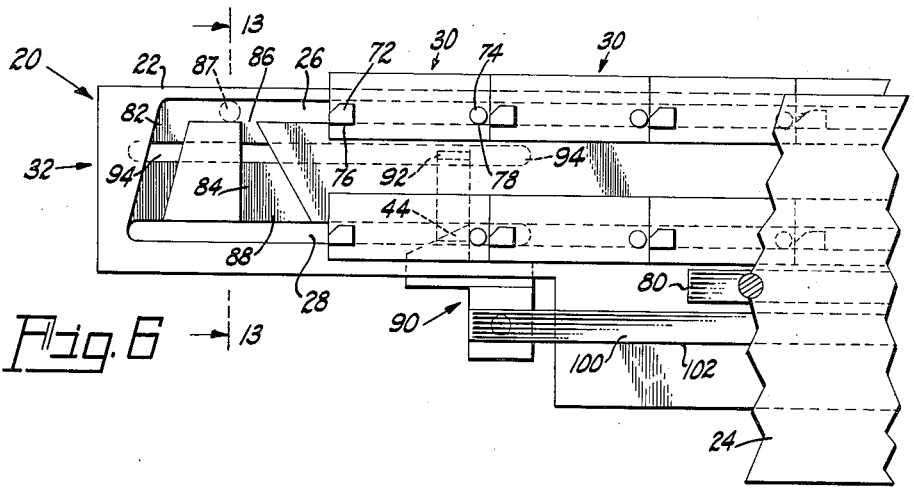
Fig. 6
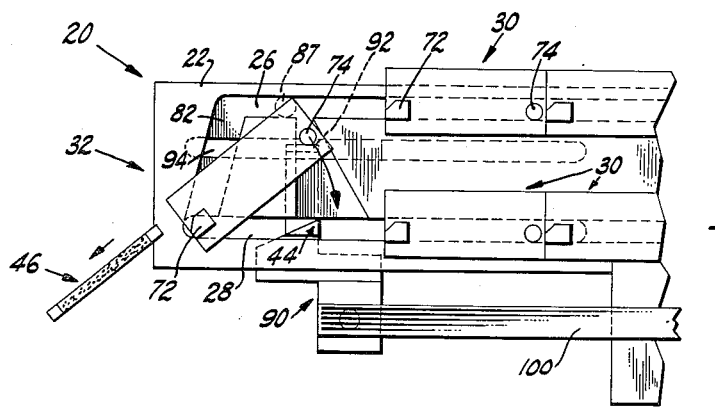
Fig. 7
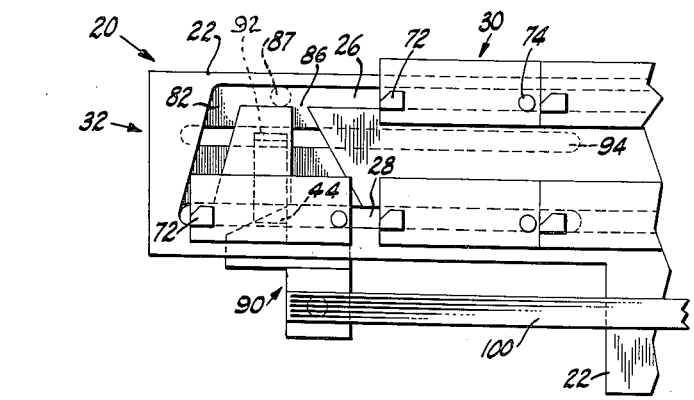
Fig. 8
INVENTORS
Stanley J. Gartner
LaRue V. Regelman
BY Michael Hertz
ATTORNEY INVENTORS
Stanley J. Gartner
LaRue V. Regelman
BY Michael Hintz
ATTORNEY

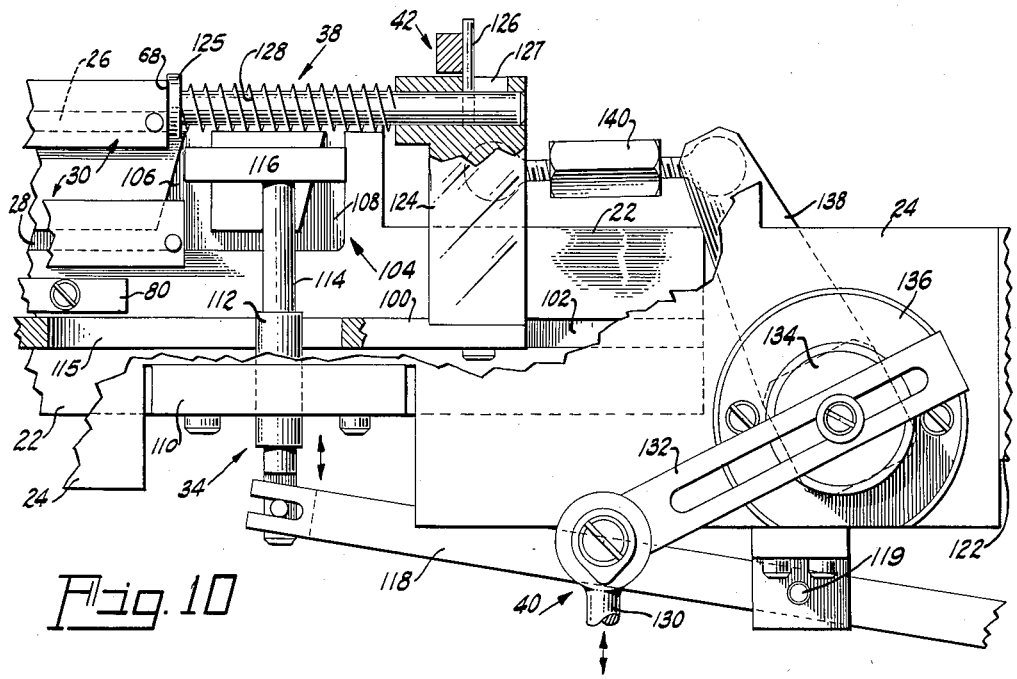

United States Patent Office 3,023,880
Patented Mar. 6, 1962

3,023,880
CONVEYOR
Stanley J. Gartner and La Rue V. Regelman, Emporium, Pa., assignors to Sylvania Electric Products Inc., a corporation of Delaware
Filed Oct. 10, 1960, Ser. No. 61,661
8 Claims. (Cl. 198—85)

This invention relates to conveyors and particularly to conveyors adapted to transport parts of an electron device from a delivery table to a receiving device of some character.

Machines employing a conveyor for this purpose are usually large and it is desirable to make the parts as compact as possible. It is therefore an object of this invention to make a conveyor of as small dimensions as possible. Also it is desirable and therefore an object of this invention to insure positive delivery of articles from this conveyor so that none will adhere thereto at the point of delivery and with the articles properly axially orientated for presentation to a receiving device, such as a chute. Furthermore, it is an object of the invention to ensure the accurate spacing of the received articles on the conveyor so that they may be discharged at proper intervals to the receiving device.

These and other objects will be attained as will be understood after reading the following specification and claims, when taken in conjunction with the accompanying drawings in which:

FIGS. 5a and 5b are, respectively, plan views of the left and right hand ends of the conveyor;

Figure 13:
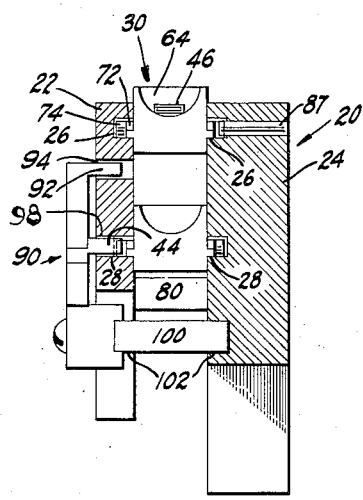

FIGS. 6, 7, and 8 are elevational views, with parts broken away, showing progressive positions assumed by a carrier in the discharge of an article carried thereby and the displacement of a carrier from an upper trackway to a lower trackway;

FIGS. 9 to 12 are elevational views of the right-hand end of the conveyor, partly in section, showing successive positions assumed by a conveyor carrier in its displacement from the lower trackway to the upper trackway, and FIG. 13 is a section on the line 13—13 of FIG. 6.

Figure 1:
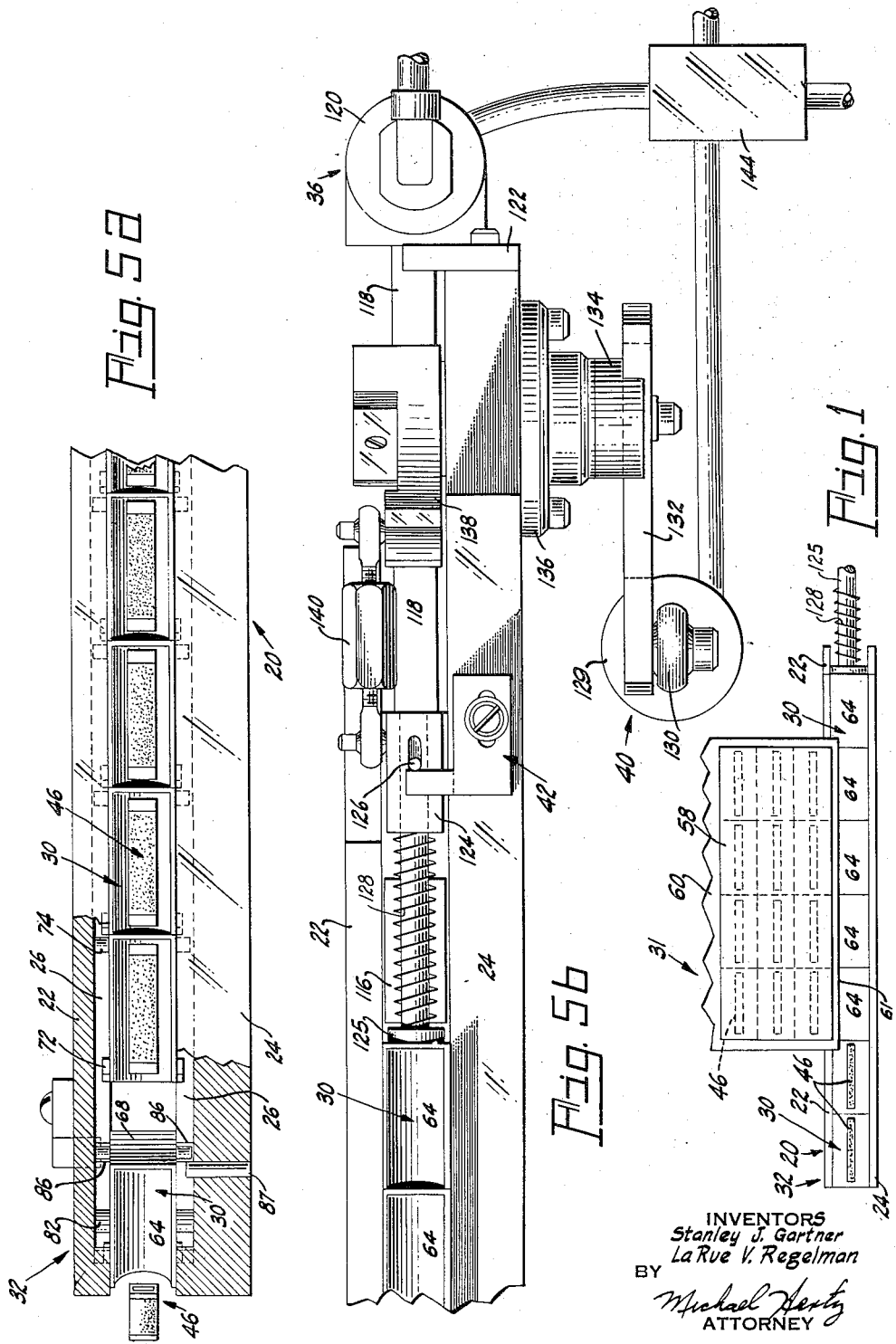
FIG. 1 is a diagrammatic sketch illustrating how articles are delivered to the conveyor.
Figure 9:
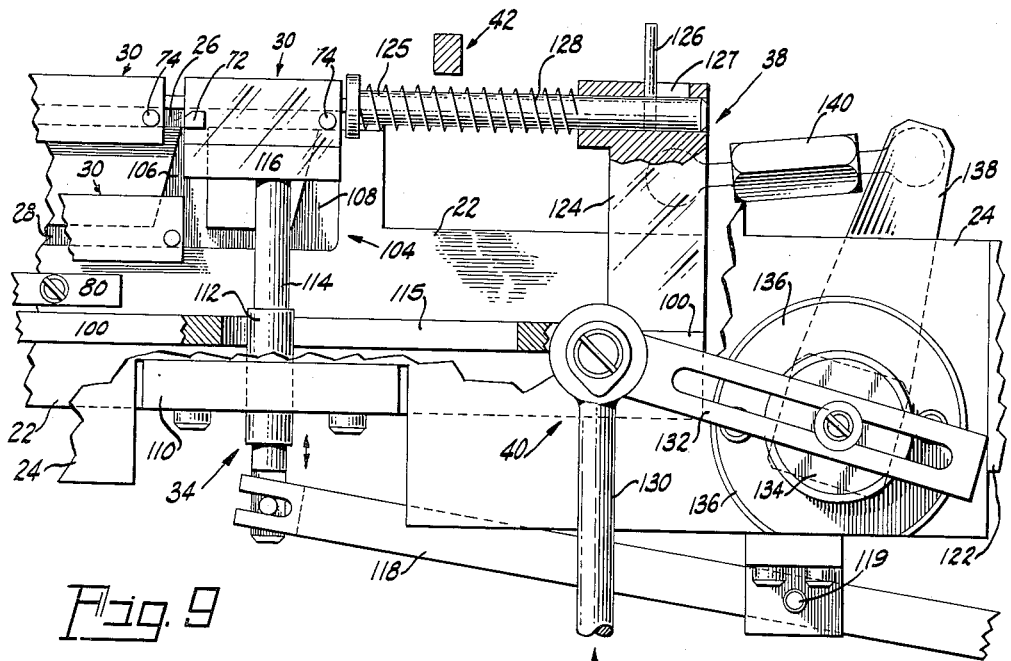

Referring now to the drawings and referring, only generically, to the parts, in FIG. 1 there is illustrated a conveyor 20 comprising a pair of spaced apart side rails 22 and 24, each having an upper track 26 and a lower track 28, see FIG. 6, formed therein, and a plurality of independent article carriers 30 adapted to be moved along these tracks. A carrier loading means 31 is positioned intermediate the ends of the conveyor and moves transversely to the direction of movement of the carriers. At the left-hand end of the conveyor 20, FIG. 1, is a carrier unloading station 32, shown in detail in FIGS. 5a, 6, 7, 8, where the carriers are unloaded and then transferred from the upper tracks 26 to the lower tracks 28. At the right-hand end of the conveyor 20, as viewed in FIG. 1, is an elevator 34, shown in detail in FIGS. 9 to 12, for transferring the carriers 30 from the lower tracks 28 to the upper tracks 26, and elevator operating means 36, see FIG. 5b, for operating the elevator. Carrier indexing means 38, see FIG. 9, is adjacent the elevator end and is operated by carrier indexing operating means 40, see FIG. 5b. A carrier advance limiting means or stop bar 42 is adjustably mounted on side rail 24 (FIGS. 5b, 9 and 10). A carrier return rake finger 44 for returning the carriers 30 from the unloading station 32 to the elevator 34 is shown in FIGS. 6, 7 and 8.

Figure 3:
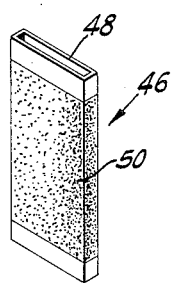
FIG. 3 is a perspective view of a cathode which may be transported within the conveyor carrier.
Figure 4:
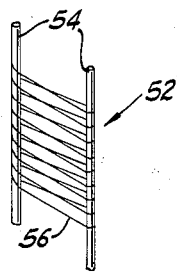
FIG. 4 is a perspective view of a grid which may be so transported.

This apparatus is especially useful for handling component parts needed in the manufacture of electron discharge devices. By way of example, two such component parts are shown in FIGURES 3 and 4. They are included by way of example only and are not intended to limit the scope of use of this invention.

In FIGURE 3, a cathode 46, of a type used in electron discharge devices, is comprised of a metallic sleeve 48 and an electron emissive coating 50 covering a major portion of the exterior surface of the sleeve.

In FIGURE 4, a wire wound grid 52, of the type used in electron discharge devices, is comprised of a pair of grid side rods 54 and grid laterals, the last being a wire 56 wound about the side rods in the form of a helix.

Referring now to the drawings in more detail, and for the moment to FIGURE 1, carrier loading means 31 is positioned intermediate the ends of conveyor 20 for loading a plurality of independently trayed articles 46 into the carriers 30. The articles, such as cathodes 46, are contained between the partition walls of an inverted compartmented tray 58 carried on table 60 and they slidably rest on the table. A loading mechanism of this nature is shown in the application of the same inventors, Serial No. 780,331, filed December 15, 1958, now Patent No. 2,970,709, assigned to the same assignee as the present invention, to which further reference may be had for further description of the loader. For the purposes of this description, it should be noted that the table 60 has a forward edge 61 terminating between the rails 22 and 24 to allow for free fall of articles beneath the tray from off the table and into the carriers therebeneath as the inverted tray is slid across the table and across the path of travel of the carriers. As shown in FIG. 1, when the tray is moved across the path of travel of the carriers, four articles at a time will be deposited in the carriers beneath the tray. However, it is obvious that the number of compartments provided in the tray may be varied, as will the number of carriers loaded at one time.

Figure 2:
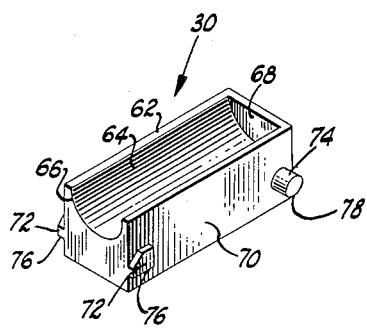
FIG. 2 is a perspective view of one of the article carriers forming part of the conveyor.

Referring now to FIGURE 2, an article carrier 30 of the type used in this apparatus has formed, in the upper surface 62 thereof, a semi-cylindrical article receiving recess 64. The carrier also has an open end 66 and a closed end 68. The sides 70 of the carrier are parallel to the axis of the recess 64 and are provided with a first pair of projections 72 adjacent the open end 66 of the recess, and a second pair of projections 74 adjacent the closed end 68 of the recess 64. The first pair of projections 72 and the second pair of projections 74 have their bottom surfaces 76 and 78 respectively, lying in a common plane to maintain the carrier in a horizontal position. Bottom surfaces 76 of the first projections 72 have a given length measured along the carrier 30 and extend laterally of the carrier for a short distance. The second pair of projections 74 are circular and have a diameter less than the length of the first projections 72 and extend laterally of the carrier a greater distance than the projections 72. The reasons for the limitations on dimensions will become apparent upon further consideration of the specification.

Figure 12:
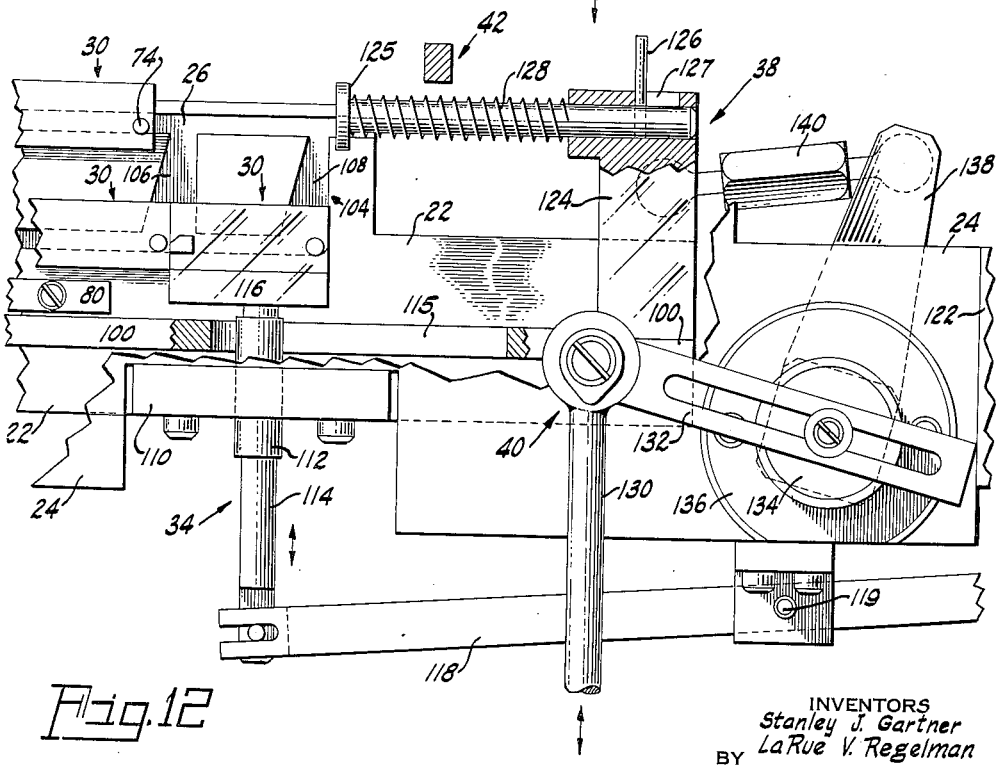

The side rails 22 and 24 are spaced apart a distance equal to the width of the carrier 30 by a spacer block 80, see FIGS. 6, 12 and 13, and are identically formed to provide the upper tracks 26 and lower tracks 28 in or upon which the projections of the carriers ride. The tracks 26 and 28, see FIG. 13, are formed to a depth greater than the height of the projections 74 on carrier 30. The carrier unloading station, shown generally at 32, is provided intermediate the upper and lower tracks, 26 and 28, at one end of the conveyor 20. At the carrier unloading station 32, see FIGS. 5a, 6, 7 and 8, the articles lying within the carriers are unloaded in the process of transferring the carriers from the upper tracks 26 to the lower tracks 28. This unloading is effected with the aid of an inclined track portion 82 (FIG. 6), which interconnects the upper and lower tracks, and trapezoidal track sections 84 which have their tops 86 in line with the upper tracks 26, and their bottoms 88 in line with the lower tracks 28. The top of the trapezoidal track section 86 has a width less than that of the bottom surface 76 of first projection 72 on carrier 30, and a width greater than the diameter of the second projection 74 on the carrier 30 and has formed adjacent thereto, in the upper track section 26 of side rail 24, a carrier stop 87 extending into the track a distance such that it will allow a projection 72 to pass by and drop into the inclined track portion 82, while it will not allow further travel of the longer projections 74 along the tracks 26, 28; thereby causing the projections 74 to drop into trapezoidal track sections 84. Thus each carrier in turn will first reach a tilted position allowing discharge of the article 46 therefrom and then, as will be explained, reach a horizontal position on the lower tracks 28.

A rake 90, FIGS. 7, 8 and 13, attached to a slide bar 100, has a rest finger 92 movably positioned within an upper slot 94 in side rail 22. Slot 94 is formed in the side rail 22 and at a level intermediate the tracks 26 and 28 and parallel therewith. The rake has fastened thereto a carrier return rake finger 44 which is movably positioned in a lower slot 98 in rail 22 and opening into its track 28. The finger is of a length in a direction toward the rail 24 such that it will project into said lower track and engage a projection 74 on a carrier 30 while allowing projection 72 on the carrier to pass unrestrained. Slots 94 and 98 permit movement of the rest finger 92 and carrier return finger 44 adjacent the trapezoidal track sections 84. Slide 100 in slideway 102 provides for synchronized movement of the finger 92, carrier return finger 44, and the carrier indexing means 38 mounted on the other end of slide 100.

Referring now to FIGURES 9 to 12, elevator 34 is provided for transferring the carriers 30 from the lower tracks 28 to the upper tracks 26. On either side of the elevator 34 and formed in the side rails are vertical track sections 104 communicating with the upper and lower tracks. Track section 104 have tapered first portions 106 wide enough to receive projections 72 on carrier 30, and second tapered portions 108 wide enough to receive projections 74 on carrier 30. The portions 106 and 108 properly guide the carrier during the rise of the elevator. The elevator comprises a support frame 110 secured to side rails 22 and 24 within which is mounted a bushing 112 and through which a shaft 114 is slidable. The bushing and shaft extend up through a slot 115 in the slide 100 to allow the slide to shift laterally. One end of the shaft 114 is secured to a vertically movable track section 116 of the elevator and the other end is secured to one end of a lever 118 pivoted on a pivot 119 mounted in a block fixed to the machine. A fluid motor 120, FIG. 5b, is mounted on a support 122 fixed to side rail 24 and is positioned above and connected to the opposite end of lever 118 to oscillate the lever.

Adjacent the upper tracks at the elevator end of the conveyor are the carrier indexing means 38 comprising a block 124 fixedly mounted on slide 100, and a plunger 125 movable within the block and adapted at one end by action of a spring 128, reacting between an enlarged end on the plunger and the block, to engage the closed end 68 of the carrier 30. The other end of the plunger has a guide and stop pin 126 confined between the walls of a slot 127 at the upper end of block 124, the pin 126 and plunger 125 being limited in their travel to the left in FIGS. 9 to 12 by engagement of the pin with the adjustable stop bar 42. Though the actual thrusting movement on the carriers is stopped by pin 126 engaging the stop bar, the slide, by reason of the spring surrounding the plunger, is permitted to continue its motion, slot 127 being long enough for this purpose.

Indexing means 40 comprises a fluid motor 129, FIG. 5b, a connecting rod 130 connected to the piston of the motor, a lever 132, FIGS. 9 to 12, pivoted to the rod and fastened at its other end by a bolt and slot connection to one end of a stub shaft 134 mounted in a face plate 136 fastened to a fixed part of the machine and an arm 138 fastened at its lower end to the other end of the stub shaft, the arm 138 at its upper end being connected to block 124 by an adjustable link 140.

A valving mechanism 144, FIG. 5b, is provided for synchronizing the carrier index and the rise of the elevator. It merely comprises a valve mechanism for alternately operating the pistons in the two motors. There are many commercially available units capable of performing this function, and as the specific character of the valves does not form a part of this invention, it will not be described in detail.

The operation of the conveyor will now be described. At the point in the cycle of operation shown in FIG. 1, the inverted tray 58 will be indexed the width of one compartment over the conveyor 20, as disclosed in the previously referred to invention, thus allowing one row of articles 46 supported on the table and confined by the partition walls of the inverted tray to drop into the recesses 64 of the article carriers 30 positioned thereunder. Conveyor 20 will index a given number of times, corresponding to the number of compartments across the tray in the direction of travel of the carriers, before tray 58 is again indexed.

Fluid motor 120 (FIG. 5b) is then actuated causing lever 118, FIG. 9, to pivot about its pivot 119 thus causing movable track section 116 of elevator 34 to rise. This action removes a carrier 30 from registration with the lower tracks 28 and places it in registration with the upper tracks 26.

Timing means 144 now actuates fluid motor 129, FIG. 5b, causing connecting rod 130 to descend. This action, transmitted through lever 132, causes shaft 134 to rotate thereby supplying movement to lever arm 138 fixed at the other end thereof. Lever arm 138 in turn, by connecting link 140, moves block 124 and the slide 100 affixed to the block. Movement of the block 124 brings the plunger 125 into contact with the closed end 68 of a carrier 30 and moves it forward from the movable track portion 116 into the upper tracks 26, see FIG. 10.

The movement of the carrier 30 from the elevator brings it into abutting contact with the end of another carrier already in the upper tracks thereby advancing the entire line of carriers forward. After the carriers have thus been advanced, the motor 120 is operated to cause the elevator to descend to its initial position.

At the unloading end of the conveyor the movement of the carriers forward has caused the first carrier in line to move from the position shown in FIGURE 6 to that shown in FIGURE 7. As the said carrier advanced, the first pair of projections 72 passed over the top 86 of trapezoidal track section 84 and continued past carrier stop 87 (shown dotted in FIGS. 6, 7 and 8), into the inclined track portion 82. As the front portion of the carrier 30 descends, the second pair of projections 74 comes into contact with carrier stop 87, and, being unable to pass, drops downward through opening 86 into trapezoidal track section 84 where further movement is restrained momentarily by contact with rest finger 92 positioned therebeneath. Movement of the finger 92 with rake 90 from the position shown in FIGURE 6 to that shown in FIGURE 7 is attained because rake 90 is fixed to slide 100, and therefore moves as part of the indexing stroke.

During the momentary inclination of the carrier, article 46, contained in the recess 64, is allowed to slide out of the carrier, as depicted in FIG. 7. In one use of the invention the article is directed into a vertical chute with flaring mouth (not shown). It should be noted that because of the shape of the recess in the carrier, the article will be discharged always in the direction of its longitudinal axis and not skewed with reference thereto. Since the action of the conveyor is intermittent and the carrier assumes an inclined position when the article is discharged, the article leaves the carrier with celerity.

Timing means 144 now continues to actuate fluid motor 129 to continue the descent of the connecting rod 130 and thereby movements of the block 124 and slide 100 ahead until pin 126 engages stop bar 42; this in turn moves finger 92 on rake 90 forward an equal distance, releasing projection 74 on carrier 30 and allowing the carrier 30 to fall to horizontal position on the lower tracks, FIG. 8.

During this phase of the operation, plunger 125 is prohibited from advancing any further by pin 126 in slot 127 being butted against stop bar 42, FIG. 11. Compression spring 128 between the plunger head and the block 124 insures the plunger being returned to its proper position for the next cycle and allows for overtravel of the motor 129.

Elevator 34 had by this time descended and is in registration with the lower tracks 28. Timing means 144 once more actuates fluid motor 129, this time in the opposite direction. As connecting rod 130 rises, block 124 and slide 100 are returned to their starting position. Carrier return rake fingers 44 on rake 90 also return with the slide, abut the second projections 74 on carrier 30 and pull the carrier rearward. This carrier abuts the carrier ahead of it already in the lower tracks and moves the entire line of lower carriers, thus depositing the first or rearmost carrier on to the movable track section 116 of the elevator 34, FIG. 12. With the elevator loaded, the entire cycle is ready to begin again.

What is claimed is:

1. In a conveyor, an upper and lower trackway and trackway sections between the trackways at the forward and rear ends of the conveyor, a line of discrete carriers abutting each other on each of the trackways, each carrier comprising a block having a recess in its top surfaces to receive an article and an open end wall at the front end of the carrier to facilitate discharge of the article, mechanism to propel a carrier on the upper trackway and, through the carrier, all those in advance thereof toward the front end of the conveyor, mechanism at the front end of the conveyor and cooperating with the carrier propelling mechanism to tilt the carrier to discharge therefrom the article carried thereby, said carrier propelling mechanism having a part movable therewith to momentarily arrest the carrier in its tilted position and then release the carrier for movement to horizontal position onto the lower trackway, said propelling mechanism having a part to engage a carrier and move that carrier and those in advance of it toward the rear on the lower trackway, and means to transfer a carrier along the rear trackway section from the bottom trackway to the upper trackway.

2. In a conveyor, an upper and a lower trackway, a trackway section at the forward end of the trackway interconnecting the trackways, and carriers movable on the trackways, each having a forward lateral long projection measured in the direction of movement of the carrier and a rear lateral projection of less length in that direction, the trackway section having substantially vertical forward and rearward slots to accommodate the projections, the rearward slot having a mount smaller than the stated length of the long projection but larger than the length of the second projection whereby in the movement of the carrier over the track section the forward projection will pass thereover and move downward in the forward slot, said rear projection moving downwardly into the rearward slot, a slide having a part driven thereby to engage and move the carriers on the upper trackway toward the forward track section, a rest finger movable with the slide which in one position of the slide underlies the rear projection to maintain the carrier in an inclined position and in another position of the slide releases the projection for movement of the carrier into horizontal position on the lower trackway, and means movable with the slide to move the released carrier rearward on the lower trackway.

3. In a conveyor, an upper trackway, a lower trackway and a communicating track section at the forward end of the conveyor interconnecting the trackways, a line of discrete carriers abutting each other on each of the trackways and slidable along the trackways, and driving mechanism located at the ends of the trackways and engaging the carriers to move the carriers along the trackways, and means on the track section as well as on the driving mechanism and on the carriers to cause carriers advancing along the upper trackway to tilt at the communicating track section and then to come to rest in horizontal position on the lower trackway.

4. In a conveyor, an upper trackway, a lower trackway and communicating track sections between the trackways at the forward and rearward ends of the trackways, discrete carriers abutting one another slidable on each of said trackways, driving means to engage a rearmost carrier on the upper trackway to move all of the carriers on that trackway forward, means coordinated with said driving means for engaging and moving the forwardmost carrier on the lower trackway and those in the rear thereof toward the rear end of the trackway, said last means including a rest finger at the track section, guide means in the forward track section cooperating with projections on the carriers and the rest finger to momentarily tilt the carrier to dump its contents, and an elevator at the rearward track section to successively transfer the carriers from the lower trackway to the upper trackway.

5. In a conveyor, the combination comprising a plurality of independent carriers, each of said carriers having an open end, a closed bottom and three contiguous side walls, the bottom and side walls defining an article receiving pocket, each of the opposed side walls being provided with a pair of projections, a first pair of the projections being positioned adjacent the open end of the carrier and having a surface of a given width measured along the length of the side and extending from the carrier a given distance, the second pair of projections being adjacent the closed end and each having a dimension of lesser width than said first projection when measured along the length of the side and extending from the carrier side wall a distance greater than the first pair of projections; a pair of side rails spaced apart a distance equal to the width of the carriers and adapted to provide upper and lower tracks in which the projections ride; a carrier unloading station intermediate the upper and lower tracks at one end of said rails whereat said carriers are unloaded and transferred from said upper tracks to said lower tracks, said transfer station including an inclined track portion interconnecting said upper and lower tracks and a trapezoidal track section wherein the top of the trapezoid is contiguous with the upper tracks and the bottom of said trapezoid is contiguous with said lower tracks, the top of said trapezoid having a width smaller than the width of one surface of said first projection and larger than the width of the surface of said second projection; a rest finger positioned within said trapezoidal track section to receive one of the pair of said second projections of the carrier while the first projections and the front end of the carrier move along the inclined track portion to the lower track, means to disengage said rest finger from said projection whereby said second projection descends and the carrier rides horizontally in the lower tracks; a drive finger projecting through an aperture in said side rail into a lower track for engagement with said second projection, said drive finger engaging the second projection while allowing said first projection to pass unrestrained; an elevator at the other end of said rails for transferring said carriers from said lower tracks to said upper tracks, said elevator comprising a track section in registration with said lower tracks and movable to registration with said upper tracks; means for operating said elevator comprising a frame secured to said spaced side rails, a member slidable within said frame and secured at one end to said movable track section and at the other end to a pivoted lever, and a fluid motor in operative relation to said pivoted lever for causing the rise and descent of said movable track section therewith; means adjacent the upper tracks at said elevated end for moving a carrier from said elevator onto said upper tracks, said carrier moving means comprising a spring biased plunger adapted to engage the closed side wall of said carrier; means to restrain said plunger after said carrier is removed from said movable track section, means for moving said spring biased plunger including a block slidably mounted on said frame, a connecting link and a pivoted lever; and means for returning said carriers from said unloading station to said elevator comprising an extension of said rest finger operated by said carrier moving means.

6. In a conveyor, the combination comprising a plurality of independent carriers of a given width; a pair of side rails spaced apart the width of said carriers and formed to provide upper and lower trackways upon which said carriers ride; a carrier unloading station intermediate the upper and lower trackways at one end of the rails including a pair of inclined track sections formed to connect said upper and lower trackways and thereby to convey said carriers from said upper trackway to said lower trackway; elevator means, for returning said carriers from said lower trackway to said upper trackway, mounted adjacent the other end of said rails; means for advancing said carriers step by step from said elevator end to said unloading station; means for momentarily inclining each carrier while at said unloading station; means for returning said carriers from said unloading station to said elevator; and means for operating said last three named means.

7. In a conveyor, the combination comprising a plurality of independent carriers of a given width, each of said carriers having sides each provided with a pair of projections, the first projection on each side extending a given distance from the side and the second projection extending a greater distance from the side; a pair of side rails spaced apart the width of said carriers and formed to provide upper and lower tracks in which said projections ride; a carrier unloading station intermediate said upper and lower tracks at one end of said rails including a first inclined track section for said first projection to ride in and a second track section for said second projection to ride in, said track sections formed to connect said upper and lower tracks and thereby to convey said carriers from said upper to said lower tracks; elevator means for returning said carriers from said lower track to said upper track mounted adjacent the other end of said rails; means for advancing said carriers seriatim step by step from said elevator end to said unloading station; means for momentarily engaging said second projection on said carrier in said second track section while said first projection is free to fall from said upper track to said lower track along said inclined track section whereby said carrier is caused to become inclined; means for returning said carriers from said unloading station to said elevator and adapted to engage only said second projections in one of said lower tracks at said unloading station; and means for operatnig said last three named means.

8. In a conveyor, the combination comprising a plurality of independent article carriers; a pair of rails formed to provide upper and lower tracks upon which said carriers ride, the length of said upper track being made substantially equal to a whole multiple of the length of one of said carriers; an unloading station at one end of said rails intermediate said upper and lower tracks whereat said carriers are emptied and transferred from said upper to said lower tracks; carrier pusher means at the other end of said rails for advancing said carriers along said upper track; means for operating said pusher means to provide step by step advancement of the carriers along said upper track a distance equal to the length of one of said carriers and toward said unloading station; said individual carriers lying in contacting relationship along said upper track; elevator means adjacent said pusher means for returning said carriers from said lower track to said upper track; and means for moving said carriers from said unloading station to said elevator means.

References Cited in the file of this patent
UNITED STATES PATENTS

| 529,778 | Bullock | Nov. 27, 1894 |
| 2,662,651 | Anderson | Dec. 15, 1953 |
| 2,838,162 | Hewitt | June 10, 1958 |